United States Patent
Ruh

(10) Patent No.: US 9,046,415 B2
(45) Date of Patent: Jun. 2, 2015

(54) VIRTUAL DETECTOR FOR SENSOR SYSTEM

(75) Inventor: Richard Ruh, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 476 days.

(21) Appl. No.: 13/610,607

(22) Filed: Sep. 11, 2012

(65) Prior Publication Data

US 2014/0070080 A1  Mar. 13, 2014

(51) Int. Cl.
*G01J 1/04* (2006.01)
*G01S 17/02* (2006.01)
*G01S 7/481* (2006.01)
*G01V 8/12* (2006.01)

(52) U.S. Cl.
CPC .............. *G01J 1/0414* (2013.01); *G01J 1/0422* (2013.01); *G01S 17/026* (2013.01); *G01S 7/4813* (2013.01); *G01V 8/12* (2013.01)

(58) Field of Classification Search
CPC ....... G01S 17/026; G01S 7/4813; G01V 8/12; G01J 1/0414; G01J 1/0422
USPC ............................................ 250/216, 559.29
See application file for complete search history.

(56) References Cited

U.S. PATENT DOCUMENTS

| | | | |
|---|---|---|---|
| 4,710,630 A | 12/1987 | Kuppenheimer, Jr. et al. | |
| 5,103,346 A | 4/1992 | Chang | |
| 5,308,985 A | 5/1994 | Lee | |
| 6,245,014 B1 * | 6/2001 | Brainard, II | 600/300 |
| 6,653,635 B2 | 11/2003 | Liao et al. | |
| 6,705,356 B2 * | 3/2004 | Barton et al. | 141/2 |
| 6,835,923 B2 | 12/2004 | Hamalainen et al. | |
| 6,844,538 B1 | 1/2005 | Hollock et al. | |
| 7,728,316 B2 | 6/2010 | Fadell et al. | |
| 2006/0289767 A1 | 12/2006 | Lung | |
| 2006/0290359 A1 * | 12/2006 | Born et al. | 324/658 |
| 2010/0171027 A1 | 7/2010 | Yun | |
| 2011/0024627 A1 | 2/2011 | Yao | |
| 2011/0057108 A1 | 3/2011 | Yao et al. | |
| 2011/0086676 A1 | 4/2011 | Choi et al. | |
| 2012/0112073 A1 | 5/2012 | Bachels et al. | |
| 2012/0132788 A1 | 5/2012 | Findlay | |

FOREIGN PATENT DOCUMENTS

EP   1 069 440 A1   1/2001

OTHER PUBLICATIONS

PCT International Search Report and the Written Opinion of the International Searching Authority for PCT/US2013/055824, mailed Nov. 18, 2013.

* cited by examiner

*Primary Examiner* — Seung C Sohn
(74) *Attorney, Agent, or Firm* — Blakely, Sokoloff, Taylor & Zafman LLP

(57) ABSTRACT

A proximity and light sensing device including a light emitting compartment having a light emitter positioned on a substrate and an optical element positioned along a side of the light emitter opposite the substrate. The device further including a light receiving compartment including a light detector positioned on the substrate and an optical element positioned along a side of the light detector opposite the substrate. A mid wall extends in a direction substantially normal to the substrate and is positioned between the light emitting compartment and the light receiving compartment. The device further includes a reflective element positioned at a side of the mid wall facing the light receiving compartment, the reflective element capable of reflecting an off-axis light beam onto the light detector so as to form a real image on the light detector of an otherwise virtual image formed behind the reflector. Other embodiments are also described.

20 Claims, 6 Drawing Sheets

VIRTUAL DETECTOR FOR SENSOR SYSTEM

FIELD

An embodiment of the invention is directed to a light and proximity sensing device having an increased sensor viewing angle. Other embodiments are also described and claimed.

BACKGROUND

Portable handheld electronic devices, such as the iPhone® multifunction device by Apple Inc., have a touch screen in their front face, where an earpiece speaker or receiver used for telephony is located. When the device is being held against the user's ear during a phone call, a proximity detector automatically senses this condition using an infrared sensor that is built into the device, and on that basis turns off the touch sensitive display screen of the device. The proximity detector can also automatically sense when the device is then moved away from the user's ear, in which case the touch screen is re-activated. This is achieved by measuring the signals of the infrared sensor's emitter and complementary detector, where the emitter transmits an infrared signal that is reflected by a nearby object (e.g. the user's head) and picked up by the detector. A stronger received signal may be interpreted by the detector to mean that the object is closer, while a weaker received signal means the object is farther away.

In many instances, the proximity sensor is combined with an ambient light sensor (ALS) which senses ambient visible light intensity. An ambient light detector process uses the sensed visible light intensity to, for example, adjust the touch screen display lighting. The ALS should have a field of view (FOV) which is larger than that of the proximity sensor, so that light from all different directions can be detected. When the proximity sensing device and the ALS device are packaged very close together, however, the field of view of the ALS may have to be limited to that of the proximity sensing device.

SUMMARY

An embodiment of the invention is directed to a light and proximity sensing device having an increased field of view. The proximity and light sensing device may include a light emitting compartment having a light emitter positioned on a substrate and an optical element positioned along a side of the light emitter opposite the substrate. A light receiving compartment may further be provided which includes a light detector positioned on the substrate and an optical element aligned with an optical path to the detector positioned along a side of the light detector opposite the substrate. A mid wall extends in a direction substantially normal to the substrate and is positioned between the light emitting compartment and the light receiving compartment to prevent cross talk between the emitter and detector.

To increase the field of view, the device further includes a reflective element. The reflective element may be positioned at a side of the mid wall facing the light receiving compartment. The reflective element may be a specular reflector capable of reflecting an off-axis light beam onto the light detector so as to form a real image on the light detector of an otherwise virtual image formed behind the reflector.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 1A:
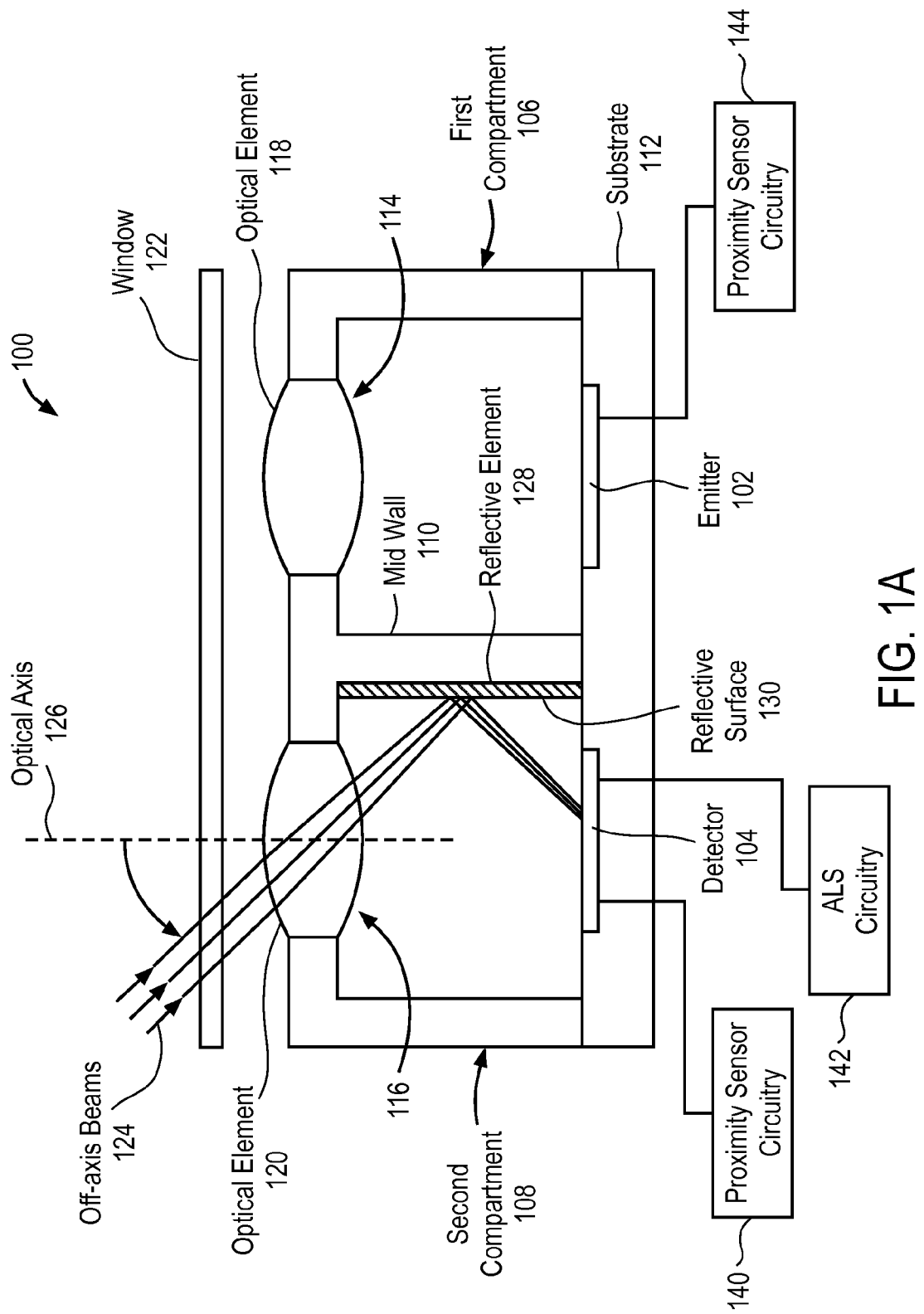
FIG. 1A is a cross sectional side view of one embodiment of a sensing device.

FIG. 1A is a side cross-sectional view of one embodiment of a sensing device. In one embodiment, sensing device 100 may be a proximity and light sensing device. In this aspect, sensing device 100 may be used to both detect a proximity of an object from the device and to detect an intensity of an ambient light surrounding the device. One implementation of this embodiment may use an emitter of infrared (IR) light and a detector of IR light to sense proximity (when sensing IR light from the emitter). The detector may also sense light from sources other than the emitter to provide an ALS function. For example, the detector may sense an intensity of visible light within the environment, such as that from the sun or other indoor/outdoor lighting sources (e.g. light bulbs). Based on the intensity of light sensed, the device within which sensing device 100 is implemented, may modify its operation (e.g. display screen functionality and/or lighting). Although a proximity and light sensing device is described herein, it is contemplated that in some embodiments, device 100 does not necessarily have to have both functionalities.

In the illustrated embodiment, sensing device 100 includes an emitter 102 and a detector 104. The emitter 102 may generate and emit light in, for example, the infrared (IR) bands as previously discussed. For example, emitter 102 may be a semiconductor light source such as a light emitting diode (LED). The detector 104 may be configured to detect changes in the intensity of light emitted from emitter 102 as well as the ambient environment outside of sensing device 100. In this aspect, detector 104 may serve as an ambient light detector as well as a proximity detector. Representatively, detector 104 may be a photodiode or other type of photodetector capable of sensing and converting IR and ambient light into a current or voltage that can then be processed by the device within which it is implemented. Detector 104 may be a single detector or may include more than one detector, for example, one detector configured to detect ambient light and another detector configured to detect IR light.

Emitter 102 may be mounted or formed within a portion of a substrate 112 within a first compartment 106 formed over substrate 112. Detector 104 may be mounted or formed within a portion of substrate 112 within a second compartment 108. In one embodiment, substrate 112 is a printed circuit board (PCB) having traces, wire bond pads and/or vias disposed thereon or therein to facilitate transfer of electrical signals between emitter 102 and detector 104 and the electronic device within which sensing device 100 is implemented. Emitter 102 may also be electrically coupled to proximity sensor circuitry 144 and detector 102 may be electrically coupled to both proximity sensor circuitry 140 and ALS circuitry 142. The circuitry may be signal processing circuitry that allows signals associated with the emitter 102 and/or detector 104 to be used by the electronic device to modify its operation (e.g. turn a display screen off).

The first and second compartments 106, 108 may be formed on opposing sides of a mid wall 110. Mid wall 110 extends from substrate 112 and prevents cross talk between emitter 102 and detector 104. Cross talk refers to an occurrence in which stray light from an emitter is detected by the detector thereby causing an undesired false signal mimicking a true proximity or object detection signal. Mid wall 110 may therefore be made of any type of material capable of blocking emitter stray signals from the detector, for example, a ceramic, a metal, a polyimide or other similar material opaque to IR light.

Sensing device 100 may further include optical element 118 and optical element 120. Optical elements 118, 120 may be lenses fitted within openings 114, 116 formed within a top wall of each of compartments 106, 108. Optical element 118 is positioned over emitter 102 such that light emitted from emitter 102 passes through optical element 118 to the ambient environment.

Optical element 120 is positioned over detector 104 such that light from emitter 102, which is reflected off a nearby object as well as ambient light from the environment, pass through optical element 120 to detector 104. Each optical element 118, 120 may be configured to transmit and refract the incoming or outgoing light beams in the desired direction. For example, in some embodiments, optical elements 118, 120 may be drum lenses which can concentrate the transmitted light and therefore increase the amount of light focused at the nearby object or detector 104. This is particularly advantageous in the case of proximity detection because it can increase proximity detection distances. It is to be understood, however, that although exemplary optical elements are described herein, such features are optional and may be omitted in some embodiments.

In some embodiments, a window 122 may further be positioned over emitter 102 and detector 104. Window 122 may be formed from a translucent or semi-translucent material such that it does not substantially modify the optical characteristics of sensing device 100. Window 122 may be part of sensing device 100 or formed as part of the portable electronic device in which sensing device 100 is implemented.

Returning to the light and proximity detecting functionality of sensing device 100, in the case of an ambient light sensor, it is desirable for the sensor to be able to sense or detect incoming light coming from all different directions. In other words, it is desirable for the ambient light sensor to have a relatively large field of view (FOV) and viewing angle. It is to be understood that the term "field of view" or "FOV" is used generally herein to refer to the area that is visible from the view point of the detector 104. The term "viewing angle" may be understood as referring to the angle of the cone defining the FOV. The proximity detector, however, does not require such a large FOV. The performance of the ALS may therefore be comprised when, for example, the ALS is integrated within an existing proximity sensor packaging, which is designed with a narrower FOV and viewing angle in mind. Moreover, even where the packaging is designed for an integrated ALS and proximity sensing system, the FOV and viewing angle may be limited by the size of the opening (e.g. opening 116) through which the incoming light beams travel and, in some cases, the associated optical element (e.g. optical element 120). This is particularly true with small portable devices such as cellular telephones in which the sensing device 100 package may be confined to, for example, an approximately 2.4 mm by 2.7 mm square footprint. In addition, due to the relatively small package size, emitter 102 and detector 104 are confined to a size no larger than their respective compartment sizes.

As a result, off-axis beams 124, which are off-axis with respect to an optical axis 126 of optical element 120 are outside of the detector FOV and transmitted by optical element 120 into mid wall 110. The term "off-axis beams" or "off-axis beam" is intended to refer to one or more incoming light beams which form an angle (a) with respect to optical axis 126. In other words, they are not parallel to optical axis 126. For example, in one embodiment, off-axis beams 124 form an angle (a) of at least 20 degrees, for example, at least 30 degrees, with respect to optical axis 126. Off-axis beams 124 may be West off-axis beams, meaning they enter sensing device 100 from the West (as viewed in FIG. 1A). It is important, particularly to the ambient light sensing functionality of sensing device 100, that detector 104 is able to detect these off-axis beams 124. Sensing device 100 therefore further includes reflective element 128 capable of reflecting off-axis beams 124 toward detector 104.

Figure 1B:
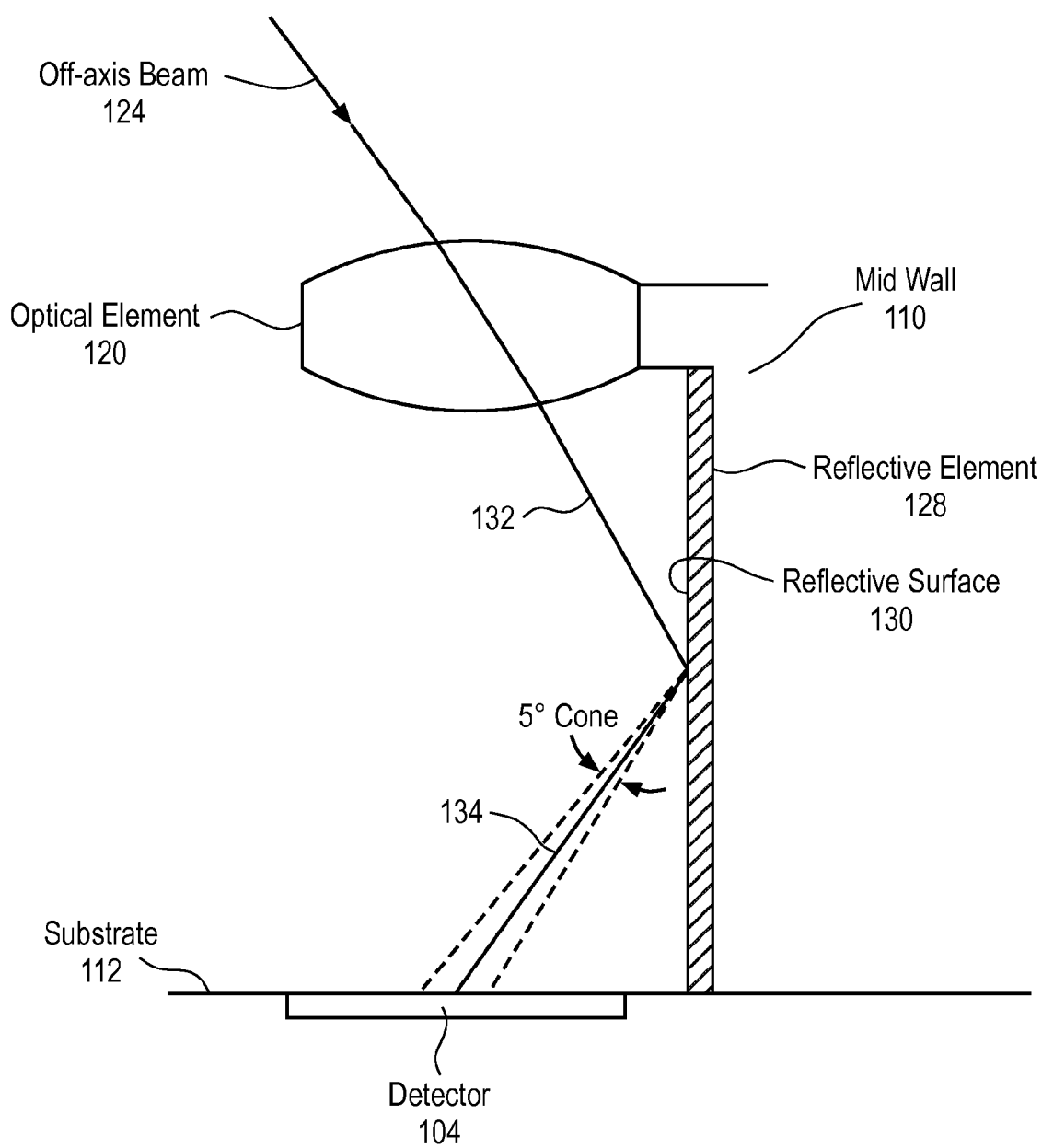
FIG. 1B is a cross sectional side view of one aspect of the sensing device of FIG. 1A.

In one embodiment, reflective element 128 is positioned along a portion of mid wall 110 that faces, and is between, optical element 120 and detector 104. The reflective surface 130 of reflective element 128 may be a flat, substantially planar surface that is oriented substantially normal to substrate 112. In one embodiment, reflective surface 130 is a specular reflector capable of creating a mirror-like reflection of the incoming off-axis light beams 124. Specular reflection refers to the ability of a surface to reflect the concentrated bundle of light rays forming the light beam as a concentrated bundle. This is in contrast to diffuse reflection, in which each of the light rays of the light beam reflect and diffuse in many different directions. In one exemplary embodiment, the degree of specular reflection achieved by reflective surface 130 may be characterized as being at least about 80 percent within a 5 degree cone, ±2 degrees. In other words, as may be understood more clearly in reference to FIG. 1B, the incident beam 132 is reflected by reflective surface 130 such that at least 80 percent, and more preferably at least 90 percent, of the reflected or specular light rays 134 making up the beam are confined to a 5 degree cone, ±2 degrees.

Reflective element 128 having reflective surface 130 may be made of any material capable of achieving specular reflection as described above. Representatively, in one embodiment, reflective element 128 is made of a flat metal piece which is polished (e.g. chemically polished) so as to form reflective surface 130. The metal piece may be insert molded into mid wall 110. Alternatively, reflective element 128 may be a reflective coating that is applied to mid wall 110 to create the reflective surface. The reflective coating may be, for example, a silver or aluminum material such as that used in making reflective mirrors. In another embodiment, mid wall 110 itself may be made of a metal material and its surface may be polished so as to form a reflective element 128 having a smooth flat reflective surface 130 capable of specular reflection as described herein. It should be understood that an unpolished metal mid wall would not be capable of achieving specular reflection because, in the absence of polishing or other processing steps, the metal material would diffuse, and may absorb, any incident light.

Figure 2:
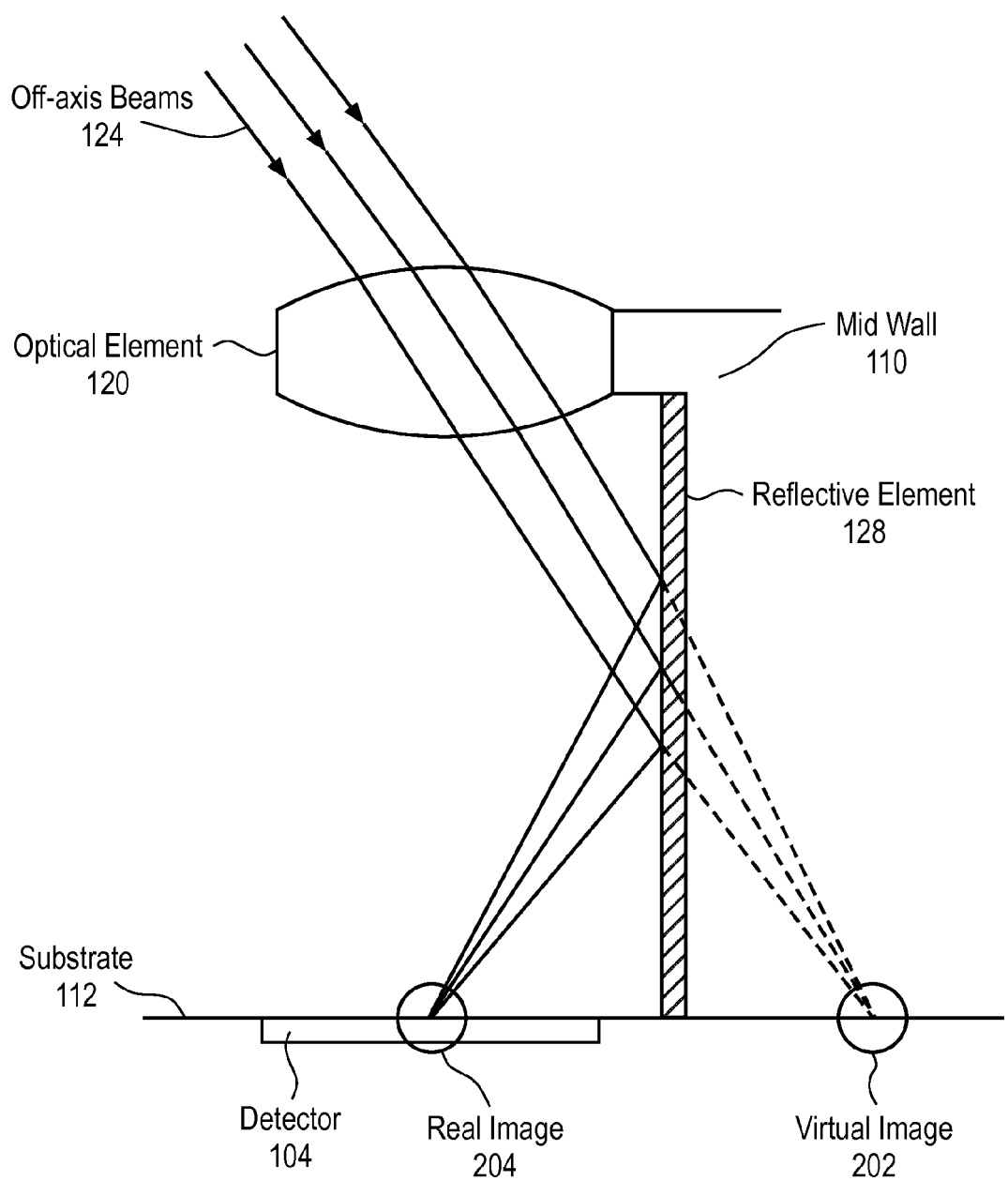
FIG. 2 is a cross sectional side view of a virtual detecting aspect of one embodiment of a sensing device.

As a result of the specularity of reflective surface 130, a virtual detector which increases the FOV and viewing angle of detector 104, with affecting the receiver size, is created within sensing device 100. In particular, as illustrated by FIG. 2, the off-axis beams 124, when traced to their point of convergence, create a virtual image 202 which is behind reflective element 128. The off-axis beams 124 are therefore outside of the viewing angle of detector 104. Reflective surface 130, however, solves this problem by creating a mirror like reflection of virtual image 202 onto detector 104. Since reflective surface 130 reflects, in some embodiments, at least 80 percent of the light energy (i.e. rays) of each off-axis beam 124, detector 104 detects the incoming beams as if it were the virtual image 202 behind reflective element 128.

Figure 3:
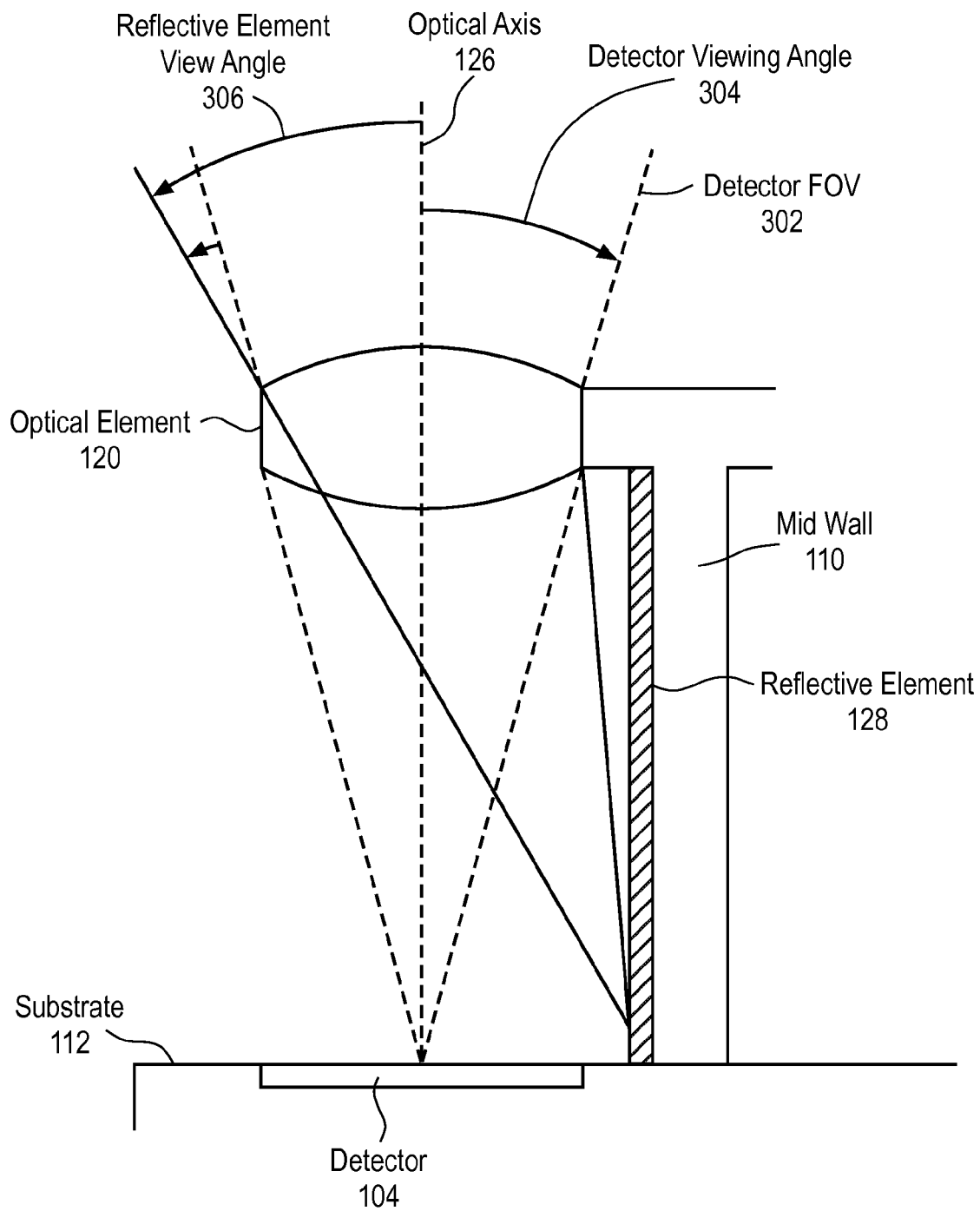
FIG. 3 is a cross sectional side view of one embodiment of a sensing device having an increased viewing angle.

The increased FOV and viewing angle of detector 104 may be better understood by comparing the viewing angle of detector 104, in the absence of reflective element 128, and the viewing angle with reflective element 128. Such a comparison is illustrated in FIG. 3. For example, as illustrated in FIG. 3, detector 104 has a FOV 302 and viewing angle 304 which may be relatively narrow due to, for example, the selection of an optical element 120 which improves proximity sensing functionality. For example, in one embodiment, the detector viewing angle 304 may be within a range of from about 10 degrees to about 20 degrees with respect to optical axis 126. In other words, without reflective element 128, detector 104 cannot sense or detect incoming light beams that are more than, for example, 10 degrees off-axis.

The addition of reflective element 128 forms a second viewing angle 306, which is wider than the detector viewing angle 304. In some embodiments, the reflective element viewing angle 306 may be greater than 10 degrees off-axis, for example more than 10 degrees off-axis, or from about 10 degrees to about 40 degrees, more specifically, from about 25 degrees to about 35 degrees, or 30 degrees. Thus, in one embodiment, reflective element 128 may be said to increase a viewing angle of detector 104 by 10 degrees or more as illustrated by angle (13). In this aspect, reflective element 128 allows beams which are off-axis by more than 10 or 20 degrees, for example 30 degrees, to be detected by detector 104.

It is noted that since reflective element 128 is positioned along mid wall 110, the viewing angle is increased with respect to the West off-axis beams (incoming beams from the West as viewed in FIG. 3, toward reflective element 128). Any East off-axis beams (incoming beams from the East as viewed in FIG. 3) may be detected by detector 104 such as by increasing a size of detector across the left side portion of substrate 112 (as viewed in FIG. 3) since there is no mid wall in this region to constrain the detector size. Alternatively, in embodiments where a greater viewing angle with respect to the East off-axis beam angle is desired, a reflective element having similar reflective properties to reflective element 128 may be added to the side of the opposing compartment wall facing detector 104.

Figure 4:
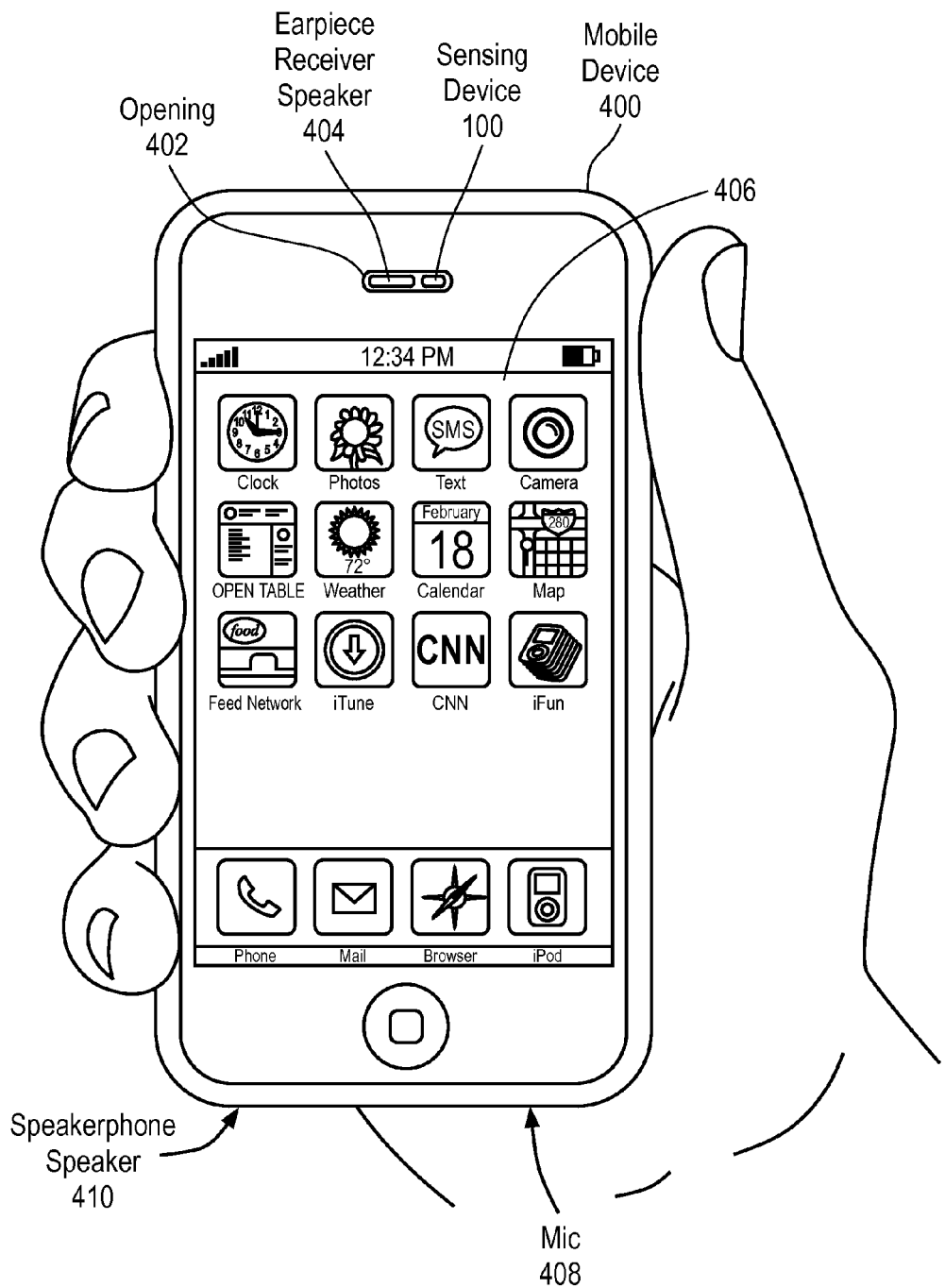
FIG. 4 is a perspective view of a handheld device within which embodiments of a sensing device may be implemented.

Turning now to FIG. 4, this figure depicts an example embodiment of a portable handheld device 400 having a sensing device 100 implemented therein. In this illustration, a near end user is holding the device 400 in their hand. Sensing device 100 may be positioned within an outer casing of hand held device 400 near an opening 402. Opening 402 may be formed within a front face of hand held device 400 so that it can sense a proximity of a user when the user draws the phone toward their face. It is contemplated, however, that sensing device 100 may be associated with an opening formed in other portions of hand held device 400, for example, within a bottom, a top or a side portion of device 400. In one embodiment, opening 402 may be associated within both an earpiece receiver 404 and sensing device 100. In other embodiments, opening 402 is configured to accommodate only sensing device 100.

Hand held device 400 may include various capabilities to enable the user to access features involving, for example, calls, text messages, voicemail, e-mail, the Internet, scheduling, photos, and music as shown on the display screen 406. In addition, hand held device 400 may include a microphone 408 and speakerphone speaker 410 to allow for input and/or output of audio signals to and from device 400. When the user holds the hand held device 400 to their head during a call in, for example, the device handset mode, the earpiece receiver speaker 404 (which may be located at a top end portion of the device 400) may be positioned against the user's ear. In that case, the sensing device 100 is situated in the general direction of the user's mouth to receive the voice signal emitted from the mouth. The emitter 104 within device 100 emits, for example, an IR light beam out opening 402. The light beam is then reflected off of the user, and a based on the intensity of the beam, handheld device 400 can determine a proximity of the user, and for example, disable the touch screen display 406 when the device 400 is determined to be close to the user's face. In addition, when sensing device 100 detects a relatively low ambient light intensity level, the display lighting may be reduced, for example, to conserve battery power.

It is to be understood that although a handheld device such as an iPhone® from Apple Computer, Inc. of Cupertino, Calif., is illustrated in FIG. 4, sensing device 100 may be implemented within any number of electronic devices that could benefit from a light and proximity sensing device. For example, sensing device 100 may be implemented within a tablet computer, a notebook computer or other portable computing device. In still further embodiments, sensing device 100 may be implemented within a digital media player, such as a portable music and/or video media player, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 5:
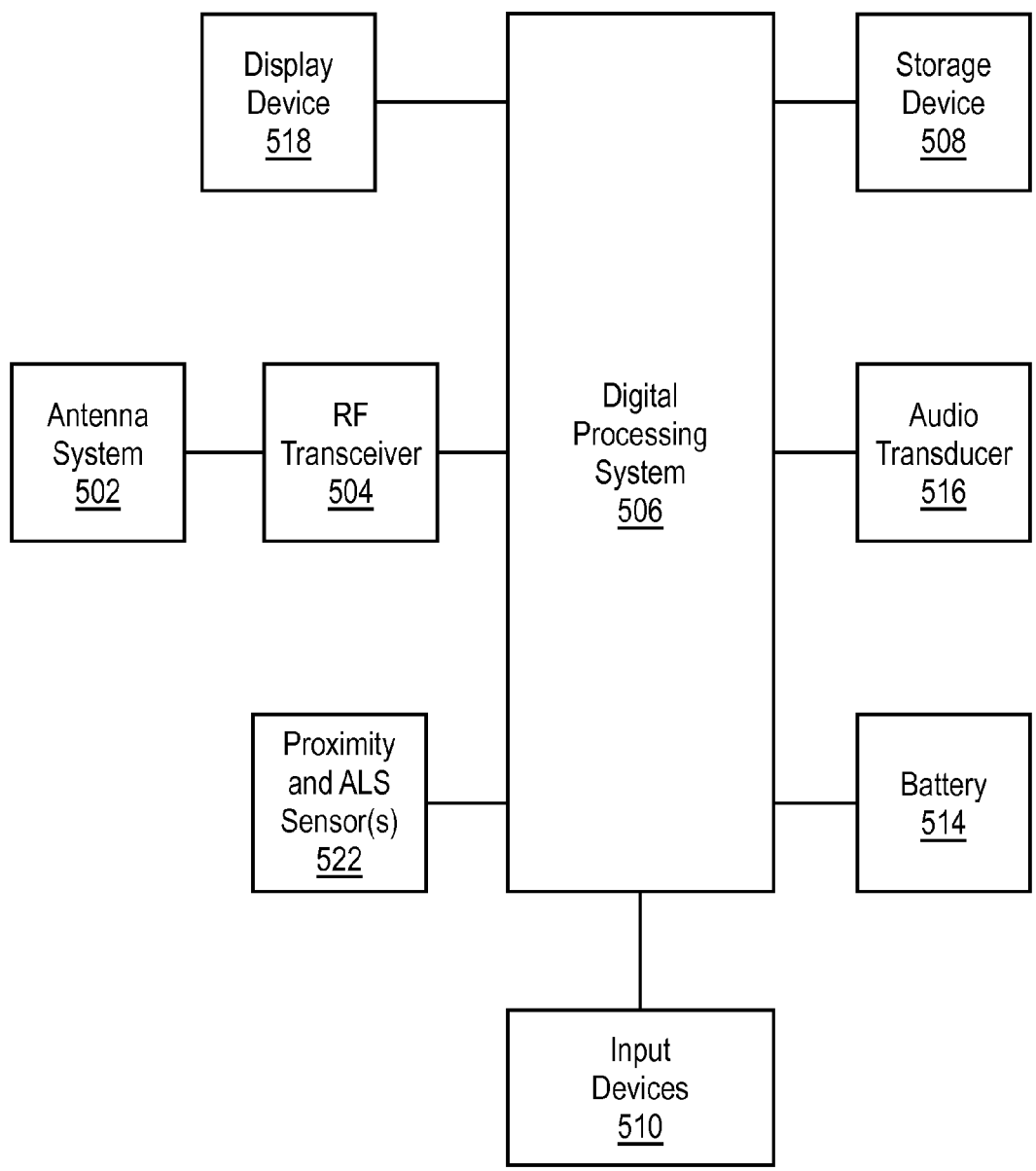
FIG. 5 is a block diagram of a system in which embodiments of a sensing device may be implemented.

FIG. 5 shows a block diagram of an embodiment of a device 500 within which sensing device 100 may be implemented. In the illustrated embodiment, device 500 is a wireless communication device. The wireless device 500 may be included in the device shown in FIG. 4, although alternative embodiments of hand held device 400 may include more or fewer components than the wireless device 500.

Wireless device 500 may include an antenna system 502. Wireless device 500 may also include a radio frequency (RF) transceiver 504, coupled to the antenna system 502, to transmit and/or receive voice, digital data and/or media signals through antenna system 502.

A digital processing system 506 may further be provided to control the digital RF transceiver and to manage the voice, digital data and/or media signals. Digital processing system 506 may be a general purpose processing device, such as a microprocessor or controller for example. Digital processing system 506 may also be a special purpose processing device, such as an ASIC (application specific integrated circuit), FPGA (field-programmable gate arbeam) or DSP (digital signal processor). Digital processing system 506 may also include other devices to interface with other components of wireless device 500. For example, digital processing system 506 may include analog-to-digital and digital-to-analog converters to interface with other components of wireless device 500.

A storage device 508, coupled to the digital processing system, may further be included in wireless device 500. Storage device 508 may store data and/or operating programs for the wireless device 500. Storage device 508 may be, for example, any type of solid-state or magnetic memory device.

One or more input devices 510, coupled to the digital processing system 506, to accept user inputs (e.g., telephone numbers, names, addresses, media selections, etc.) or output information to a far end user may further be provided. Exemplary input devices may be, for example, one or more of a keypad, a touchpad, a touch screen, a pointing device in combination with a display device or similar input device.

Display device 518 may be coupled to the digital processing system 506, to display information such as messages, telephone call information, contact information, pictures, movies and/or titles or other indicators of media being selected via the input device 510. Display device 518 may be, for example, an LCD display device. In one embodiment, display device 518 and input device 510 may be integrated together in the same device (e.g., a touch screen LCD such as a multi-touch input panel which is integrated with a display device, such as an LCD display device). It will be appreciated that the wireless device 500 may include multiple displays.

Battery 514 may further be provided to supply operating power to components of the system including digital RF transceiver 504, digital processing system 506, storage device 508, input device 510, audio transducer 516, proximity and ALS sensors 522 (e.g. sensing device 100), and display device 518. Battery 514 may be, for example, a rechargeable or non-rechargeable lithium or nickel metal hydride battery. Wireless device 500 may also include audio transducers 516, which may include one or more speakers, receivers and at least one microphone.

Proximity and ALS sensors 522 may be coupled to the digital processing system 506. The proximity and ALS sensors 522 may include, for example, one or more of a light and proximity sensor (e.g., sensing device 100), accelerometer, touch input panel, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the proximity and ALS sensors 522, various responses may be performed automatically by the digital processing system, such as, for example, activating or deactivating the backlight 518A, changing a setting of the input device 510 (e.g. switching between processing or not processing, as an intentional user input, any input data from an input device), and other responses and combinations thereof.

More specifically, proximity and ALS sensors 522 may include one or more ALS or proximity sensors (e.g. sensing device 100) which provide data relating to light. The data can be analyzed by digital processing system 506 to determine whether or not to adjust one or more settings of wireless device 500. Ambient light level data may be provided by an ambient light sensor feature of sensing device 100, which indicates the level of light intensity surrounding that sensor. For example, ambient light differential data may be obtained from two or more ambient light sensors which are disposed at different positions on the device. For example, one ambient light sensor may be on one side of the device, and another ambient light sensor may be on another side of the device. A difference in the light intensity levels may be determined by comparing the data from these two ambient light sensors on two different sides or surfaces of the device.

There are a variety of possible uses of a light sensor. For example, the light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g. by repeatedly turning on and off the backlight) to indicate an incoming call. Another exemplary use of a light sensor involves using it as an alarm indicating that a dark room (or environment) has become brighter (e.g. the sun has risen or a door to a darkened room is opened to let light into the room). A light sensor may also be used to cause a device to automatically act as a source of light (e.g. as a flashlight, in effect) upon sensing a low ambient light level.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although portable handle held devices are described herein, it is contemplated that the sensing device may be implemented in other types of devices including, but not limited to, a desk top computer, television or the like. The description is thus to be regarded as illustrative instead of limiting.

What is claimed is:
1. A proximity and light sensing apparatus comprising:
a light emitting compartment having a light emitter for proximity sensing positioned on a substrate and an optical element positioned along a side of the light emitter opposite the substrate;
a light receiving compartment having a light detector positioned on the substrate and an optical element positioned along a side of the light detector opposite the substrate;
a mid wall extending in a direction substantially normal to the substrate, the mid wall positioned between the light emitting compartment and the light receiving compartment; and
a reflective element positioned at a side of the mid wall facing the light receiving compartment, the reflective element capable of reflecting an off-axis light beam onto the light detector so as to form a real image on the light detector of an otherwise virtual image formed behind the reflector.

2. The apparatus of claim 1 wherein the light detector is capable of detecting visible light and infrared (IR) light emitted from the light emitting device.

3. The apparatus of claim 1 wherein the reflective element has a substantially planar reflecting surface.

4. The apparatus of claim 1 wherein the reflective element is a substantially planar molded metal piece mounted to the mid wall.

5. The apparatus of claim 1 wherein the mid wall is a metallic structure and the reflective element is a chemically polished portion of the metallic structure.

6. The apparatus of claim 1 wherein the reflective element is a specular reflector.

7. The apparatus of claim 1 wherein the reflective element is capable of specular reflection of at least 80 percent of the off-axis light beam within a 5 degree cone.

8. The apparatus of claim 1 wherein the off-axis light beam is off-axis with respect to an optical axis of the optical element by at least 30 degrees.

9. A proximity and light sensing apparatus comprising:
a light emitter positioned on a substrate;
a light detector positioned on the substrate, the light detector configured to detect light beams from the light emitter and a source other than the emitter; and
a reflector positioned between the light emitter and the light detector, the reflector having a substantially planar reflective surface which is substantially normal to the substrate surface and facing the detector, the reflective surface capable of specular reflection of off-axis light beams toward the light detector.

10. The apparatus of claim 9 wherein the source other than the emitter is an ambient light source capable of emitting visible light.

11. The apparatus of claim 9 further comprising:
an optical element positioned along a side of the light detector opposite the substrate for transmitting the light beams to the light detector.

12. The apparatus of claim 9 wherein the light emitter and the light detector are contained in separate compartments on opposite sides of the reflector.

13. The apparatus of claim 9 wherein the reflective surface is made of a polished metal material.

14. The apparatus of claim 11 wherein the off-axis light beams are off-axis with respect to an optical axis of the optical element within a range of from 20 degrees to 30 degrees.

15. The apparatus of claim 11 wherein the reflective surface is capable of specular reflection of at least 80 percent of an energy of the off-axis light beams toward the light detector.

16. A proximity and light sensing apparatus comprising:
a light detecting device comprising a light detector and an optical element configured to define a first viewing angle and transmit incoming light beams within the first viewing angle to the light detector; and
a substantially planar reflector positioned between the light detector and the optical element, the substantially planar reflector to define a second viewing angle which is wider than the first viewing angle and reflect incoming light beams outside of the first viewing angle onto the light detector.

17. The apparatus of claim 16 further comprising:
a light emitting device comprising a light emitter and an optical element, wherein the light emitting device is separated from the light detecting device by a mid wall and the reflector is positioned along the mid wall.

18. The apparatus of claim 17 wherein the light detector is capable of detecting ambient light and light emitted from the light emitter.

19. The apparatus of claim 16 wherein the second viewing angle has a viewing angle at least 10 degrees larger than the first viewing angle.

20. The apparatus of claim 16 wherein the second viewing angle allows the light detector to detect off-axis light beams which are off-axis to an optical axis of the optical element by at least 30 degrees.

* * * * *